United States Patent
Ito et al.

(10) Patent No.: US 6,850,318 B1
(45) Date of Patent: Feb. 1, 2005

(54) POLARIZATION MODE DISPERSION MEASURING DEVICE AND POLARIZATION MODE DISPERSION MEASURING METHOD

(75) Inventors: Hiromasa Ito, Sendai (JP); Masato Yoshida, Sendai (JP); Toshiyuki Miyamoto, Sendai (JP); Koichiro Nakamura, Sendai (JP)

(73) Assignee: Japan Science and Technology Agency, Saitama (JP)

( * ) Notice: Subject to any disclaimer, the term of this patent is extended or adjusted under 35 U.S.C. 154(b) by 203 days.

(21) Appl. No.: 10/182,697

(22) PCT Filed: Sep. 22, 2000

(86) PCT No.: PCT/JP00/06509

§ 371 (c)(1),
(2), (4) Date: Nov. 7, 2002

(87) PCT Pub. No.: WO01/61303

PCT Pub. Date: Aug. 23, 2001

(30) Foreign Application Priority Data

Feb. 21, 2000 (JP) ........................................ 2000-042175

(51) Int. Cl.$^7$ ............................................. G01N 21/00
(52) U.S. Cl. ..................................................... 356/73.1
(58) Field of Search ....................... 356/73.1, 364–368, 356/345, 351; 385/27, 24, 147; 250/225, 227.1

(56) References Cited

U.S. PATENT DOCUMENTS

| | | | |
|---|---|---|---|
| 5,717,489 A | | 2/1998 | Ozeki et al. |
| 6,144,450 A | * | 11/2000 | Jopson et al. ............... 356/364 |
| 6,229,599 B1 | * | 5/2001 | Galtarossa ................. 356/73.1 |
| 6,229,606 B1 | * | 5/2001 | Way et al. .................. 356/364 |

FOREIGN PATENT DOCUMENTS

| | | |
|---|---|---|
| JP | 61-047533 | 3/1986 |
| JP | 09-264814 | 10/1997 |
| JP | 2000-081374 | 3/2000 |

OTHER PUBLICATIONS

Namihira, "ITU–T Polarization Mode Dispersion (PMD) Round Robin Measurements for Optical Fibers and Components," KDD R&D No. 159 Mar. 1998, pp. 33–46.

Koichiro Nakamura et al., "A New Technique of Optical Ranging by a Frequency–Shifted Feedback Laser," IEEE Photonics Technology Letters, IEEE Inc. New York, US, vol. 10, No. 12, Dec. 1998, pp. 1772–1774.

Mochizuki K et al., "Polarisation Mode Dispersion Measurements in Long Single Mode Fibres," Electronics Letters, IEE Stevenage, GB, vol. 17, No. 4, Feb. 19, 1981, pp. 153–154.

Supplementary European Search Report for US Patent Application No. 10/182,697 dated Mar. 14, 2003.

* cited by examiner

*Primary Examiner*—Tu T. Nguyen
(74) *Attorney, Agent, or Firm*—Neifeld IP Law, PC

(57) ABSTRACT

An apparatus and method for measuring polarization mode dispersion (PMD) using a polarization mode dispersion measuring device, comprising an FSF laser generating frequency chirped light, an optical amplifier amplifying the frequency chirped light, an offset circuit, a λ/2 plate, a beam splitter, an analyzer retrieving polarization components measured from each light wave after propagating through the fast axis and the delay axis of the optical fiber under test, a lens, a photodetector detecting a light wave passed through the lens, and an RF spectrum analyzer observing a spectrum waveform of the light wave. The frequency chirped light, after propagating through the optical fiber under test and passing through the analyzer, is detected and the variation in beat frequency is measured to determine a PMD value.

12 Claims, 15 Drawing Sheets

PMD MEASUREMENT SYSTEM USING FSF LASER

CHIRPED FREQUENCY COMB CHARACTERISTICS OF OUTPUT OF FREQUENCY-SHIFTED FEEDBACK LASER

SPECTRAL PROFILE OF FSF LASER, OBTAINED BY OPTICAL SPECTRUM ANALYZER (MEASUREMENT RESOLUTION: 0.1 nm)

FIG. 7
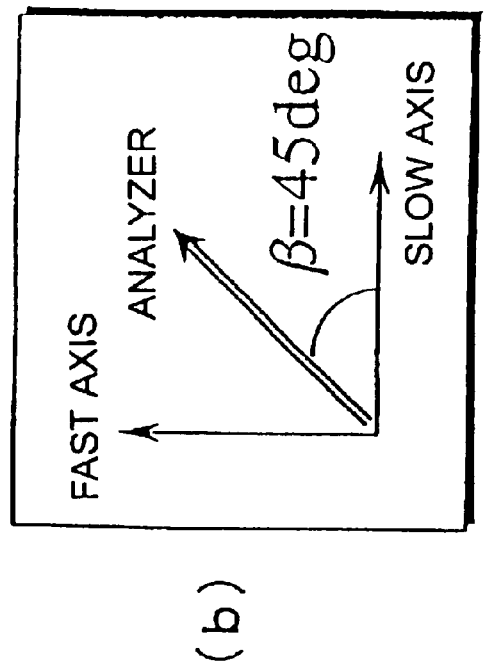
(b)
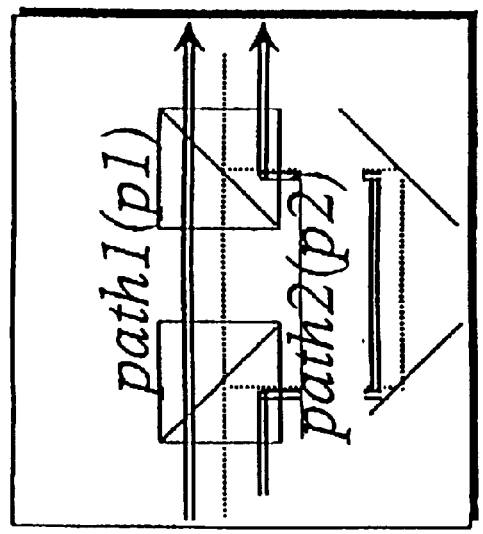
(a)

FIG. 10
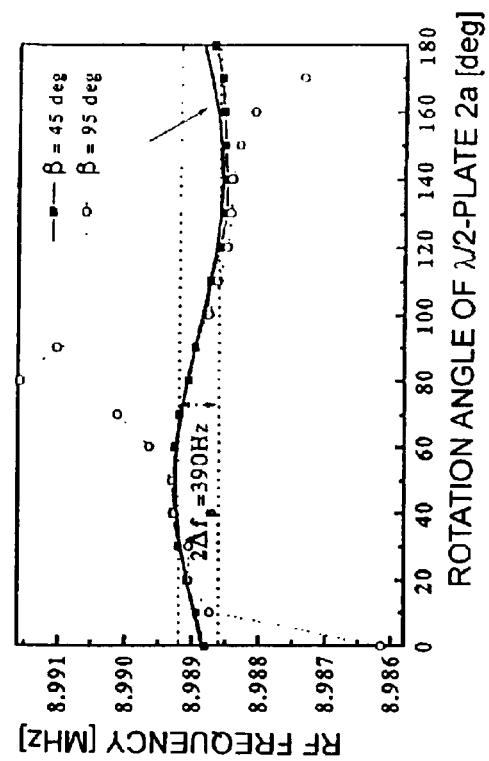
(b) RELATION BETWEEN INCIDENT ANGLE AND BEAT FREQUENCY
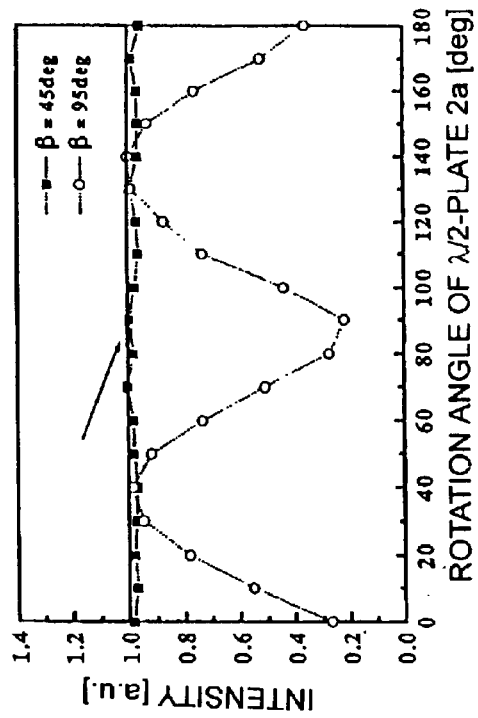
(a) RELATION BETWEEN INCIDENT ANGLE AND INTENSITY OF BEAT SPECTRUM
PMD MEASUREMENT RESULTS (SMF'S L = 20 km)

POLARIZATION MODE DISPERSION MEASURING DEVICE AND POLARIZATION MODE DISPERSION MEASURING METHOD

TECHNICAL FIELD

The present invention relates to polarization-mode-dispersion measuring devices and polarization-mode-dispersion measuring methods for measuring polarization-mode dispersion among the dispersion characteristics of optical fibers.

BACKGROUND ART

In the field of long-distance optical communication, as the transmission rate has increased, managing the dispersion characteristics of optical transmission fibers has become an important issue. Polarization-mode dispersion (PMD) is one dispersion factor, and is caused by a group delay between two orthogonal polarization modes.

In optical fibers used for regular optical communication, since the core diameter has a shape that deviates from an ideal circle due to external stresses such as heat, tension, and pressure, birefringence occurs inside the core, which causes PMD. Since PMD is one factor limiting the transmission capacity in high-speed optical communication, it has become increasingly necessary to manage PMD in recent years.

DISCLOSURE OF INVENTION

PMD measurement can be roughly divided into measurement in the time domain and measurement in the frequency domain. The former is performed by an interference method etc., and the latter is performed by a fixed analyzer method, a polarimetric method (such as the Poincaré sphere method, the Jones Matrix (JME) method, or the SOP (State of Polarization) method), etc. In these measurement methods, however, is it necessary to arrange an optical detection system at the output end of an optical fiber under test (optical fiber to be measured) and therefore, measurement is difficult in existing optical communication networks, and in addition, the measurement system tends to be complicated.

The present invention has been made in view of the foregoing situation. An object of the present invention is to provide a polarization-mode-dispersion measuring device and a polarization-mode-dispersion measuring method which allow PMD measurement to be performed at a high sensitivity with an easy technique. Further, another object of the present invention is to always allow polarization-mode-dispersion measurement to be performed without making a generated beat signal undetectable in a DC component even when the PMD value is small.

To solve the foregoing problems, according to first solving means of the present invention, a polarization-mode-dispersion measuring device is provided which includes:

chirped light generating means for generating frequency-chirped light whose frequency changes in proportion to time;

offset means for branching the frequency-chirped light generated by the chirped light generating means into two orthogonal linearly polarized components and for applying an optical path difference to the two linearly polarized components;

a wave plate for rotating the linear-polarization directions of the frequency-chirped light sent from the offset means, by a predetermined angle;

an analyzer for passing polarization components required for measurement after the frequency-chirped light has passed through the wave plate and has propagated through an optical fiber under test; and detection means for detecting light waves which pass through the analyzer, and for detecting the polarization-mode dispersion value of the optical fiber under test according to a beat signal of the detected light waves.

In addition, according to second solving means of the present invention, a polarization-mode-dispersion measuring method is provided which includes:

a step of generating frequency-chirped light whose frequency changes in proportion to time;

a step of branching the generated frequency-chirped light into two orthogonal linearly polarized components and of applying an optical path difference to the two linearly polarized components;

a step of rotating the linear-polarization directions of the frequency-chirped light by a predetermined angle;

a step of propagating the frequency-chirped light to which the optical path difference is applied, through an optical fiber under test;

a step of passing polarization components required for measurement after the frequency-chirped light has propagated through the optical fiber under test; and a step of detecting the light waves which pass through, and of detecting the polarization-mode dispersion value of the optical fiber under test according to a beat signal of the detected light waves.

Further, in the present invention, since a group delay time between light waves propagating along a fast axis and a slow axis of an optical fiber under test, the group delay being generated due to polarization-mode dispersion, is calculated from the frequency of the beat signal generated between the light waves, the polarization-mode dispersion is calculated with high sensitivity. In addition, in the present invention, since an analyzer having an angle of about 45 degrees with respect to the fast axis and the slow axis of the optical fiber under test is provided, polarization components required for measurement are extracted from the light waves propagating along both the fast axis and the slow axis.

Further, in the present invention, since first diffraction light frequency-shifted by the Doppler effect is fed back to generate the frequency-chirped light, the frequency-chirped light has superior linearity. In addition, in the present invention, since a ring cavity in which a predetermined gain medium, a predetermined excitation light source, wavelength division multiplexing couplers, an output coupler, a polarization controller, optical isolators, and a frequency-shifting element are connected in a ring shape generates frequency-chirped light, the frequency is shifted by a predetermined frequency with high sensitivity in every cycle of the ring cavity.

Further, since a polarization-mode-dispersion value is detected according to the change in beat frequency of two light waves to which an optical path difference has been applied by the offset means, the polarization-mode-dispersion value is detected simply and with high sensitivity. In addition, in the present invention, since the fact that the beat spectral profile differs according to the incident angle of the light wave obtained after passing through the offset means is taken into consideration, the change in beat frequency can be measured according to the beat spectrum intensity with respect to the incident angle.

BRIEF DESCRIPTION OF THE DRAWINGS

FIGS. 7(a) and 7(b) are views showing light waves in an offset circuit and a component passing through an analyzer.

FIG. 10(a) is a view showing the relation between the incident angle and intensity of beat spectrum, and FIG. 10(b) is a view showing the relation between the incident angle and beat frequency.

BEST MODE FOR CARRYING OUT THE INVENTION

Figure 1:
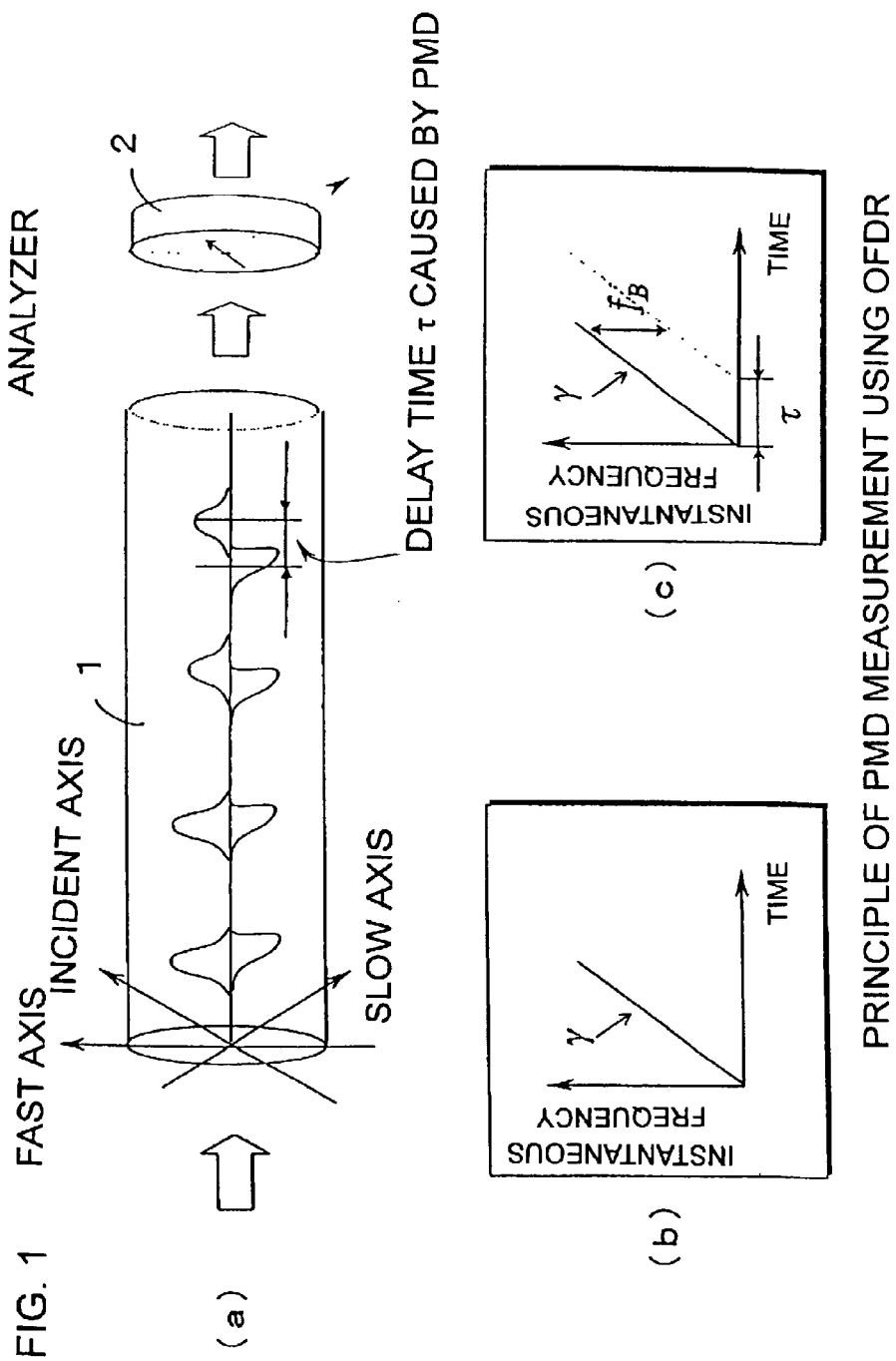
FIGS. 1(*a*), 1(*b*), and 1(*c*) are views describing the principle of PMD measurement carried out by a polarization-mode-dispersion measuring device according to the present invention.

A polarization-mode-dispersion measuring device and a polarization-mode-dispersion measuring method according to the present invention will be specifically described below by referring to the drawings.

In particular, in the present invention, optical frequency domain reflectometry (OFDR) is used to perform PMD measurement. More specifically, the transmission-time dependency on polarization state caused by the PMD is obtained from a beat frequency. A frequency-shifted feedback laser (FSF laser) developed by the present applicant is used as a light source, and a simple polarization-mode-dispersion measuring device which allows PMD measurement to be performed only at a single end face of an optical fiber under test is used. A polarization-mode-dispersion measuring device and a polarization-mode-dispersion measuring method according to the present invention will be described below in detail.

FIG. 1 is a view showing the PMD measurement principle employed by a polarization-mode-dispersion measuring device according to the present invention. FIG. 1(a) shows a typical instantaneous frequency component propagating through an optical fiber 1, and FIG. 1(b) and FIG. 1(c) show the instantaneous frequency of frequency-chirped light incident on the optical fiber 1, and the instantaneous frequency of frequency-chirped light propagating in the optical fiber 1, respectively. Frequency-chirped light means an optical wave whose frequency changes with time.

When the optical fiber 1 exhibits PMD, a propagation time difference occurs between optical waves propagating along the fast axis and the slow axis of the optical fiber 1, and the optical waves show a characteristic such as that shown in FIG. 1(c) after propagation through the optical fiber 1. Since these two optical waves are orthogonal to each other, an analyzer 2 set at an angle of 45 degrees (or almost 45 degrees) with respect to the fast axis and the slow axis is disposed at the emission side of the fiber 1 (FUT) under test in order to extract a polarization component required for measurement from the optical waves. The frequency-chirped light propagates through the optical fiber 1 under test, then passes through the analyzer 2, and is detected. With the use of a self-beat signal obtained in this operation, the PMD value is detected.

In such a PMD-value measurement technique, the linearity of the frequency-chirped light source is important. The use of an FSF laser, which has superior linearity, makes high-accuracy PMD measurement possible.

The PMD value $\tau$ is given by expression (1), $$\tau = f_B/\gamma \qquad (1)$$

where, $\gamma$ indicates the chirp rate of the frequency-chirped light, $f_B$ indicates the frequency of a beat signal generated by OFDR, and $\gamma = \nu_{FS}/\tau_{RT}$ ($\tau_{RT}$ indicates the cycle time of the cavity, and $\mu_{FS}$ indicates the amount of frequency shift per cycle of the cavity).

Figure 2:
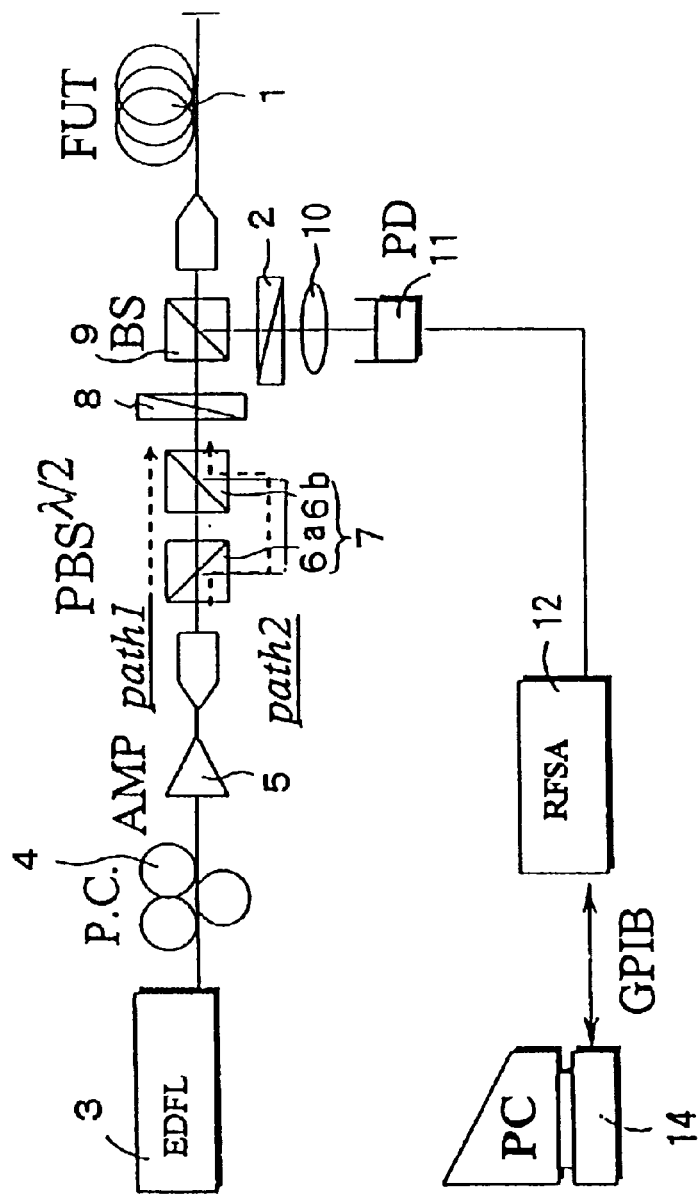
FIG. 2 is a block diagram showing the entire configuration of a polarization-mode-dispersion measuring device according to a first embodiment of the present invention.

FIG. 2 is a block diagram showing the entire configuration of a polarization-mode-dispersion measuring device according to an embodiment of the present invention. The polarization-mode-dispersion measuring device shown in the figure includes an FSF laser (FSFL, serving as chirped light generating means) 3 for generating frequency-chirped light; a polarization controller (PC) 4; an optical amplifier (AMP) 5 for amplifying the frequency-chirped light; an offset circuit (offset means) 7 formed of a Mach-Zehnder interferometer, or the like, having two polarization beam splitters (PBS) 6a and 6b for applying an optical path difference to the two orthogonal linearly polarized components of the frequency-chirped light; a λ/2 plate 8; a beam splitter (BS) 9 for switching the optical path; an analyzer 2 at a predetermined angle with respect to the fast axis and the slow axis of the optical fiber 1 under test, for extracting polarization components required for measurement when each light wave which has propagated through the optical fiber 1 under test passes therethrough; a lens 10 for focusing the light wave which has passed through the analyzer 2; a photodetector (PD) 11 for detecting the light wave which has passed through the lens 10; an RF spectrum analyzer (RFSA, serving as detection means) 12 for observing the spectral profile of the light wave; and a computer (PC) 14 for detecting the PMD according to the observation results obtained by the RFSA 12. A reflecting mirror may be provided at the output end (the end disposed opposite to the BS 9) of the optical fiber 1 or in the vicinity thereof.

In such a configuration, frequency-chirped light (measurement light) output from the FSF laser 3, which serves as a light source, is incident on the offset circuit 7 through the polarization controller 4 and the AMP 5. In the offset circuit 7, among orthogonal linearly polarized beams of the frequency-chirped light emitted from the FSF laser 3, a beam linearly polarized in one direction passes straight through the PBS 6a and a beam linearly polarized in the other direction is reflected from the PBS 6a to divide the frequency-chirped light into two linearly polarized components, and to apply an optical path difference to the two components. The two light waves having such an optical path difference are again coupled by the other PBS 6b in the offset circuit 7, the λ/2 plate 8 changes the polarization direction of each linearly polarized component to a predetermined polarization angle, and the coupled light wave is incident on the optical fiber 1 under test. The light wave is reflected by a mirror or the like provided at the output end of the optical fiber 1 under test or in the vicinity of the output end. The reflected light is output from the input end of the optical fiber 1 under test, passes through the analyzer 2 via the BS 9, so that polarization components required for measurement are extracted. The polarization components are received by the PD 11, and then a beat signal generated by the linearly polarized components is received. The received beat signal is used to calculate the PMD value (details will be described later).

The FSF laser 3 for generating frequency-chirped light will be described here in detail.

The FSF laser 3 shown in FIG. 2 has an acousto-optic modulator (AOM) serving as a frequency-shifting element inside a cavity, and feeds back first diffraction light frequency-shifted by the Doppler effect to generate laser light.

The inventors have theoretically and experimentally found that the instantaneous frequency component of the output from the FSF laser 3 is composed of a multiple components (chirp frequency comb) which chirps with time. In such a cavity, a standing wave cannot exit, and the instantaneous frequency $v_i(t)$ is given by expression (2):

$$v_1(t) = \frac{v_{FS}}{\tau_{RT}} t - \frac{q}{\tau_{RT}} \quad (2)$$

In expression (2), $\tau_{RT}$ indicates the cycle time of the cavity ($1/\tau_{RT}$ is the longitudinal-mode frequency of the cavity), $v_{FS}$ indicates the amount of frequency shift per cycle of the cavity, and q is an integer.

In a frequency-shifted feedback type cavity used for the FSF laser 3, the instantaneous frequency allowed at a certain moment exists in every cavity longitudinal-mode frequency ($1/\tau_{RT}$) interval, and frequency chirping is continuously applied to individual instantaneous frequency components (frequency comb components) at a rate ($\gamma=v_{FS}/\tau_{RT}$) equivalent to the amount of frequency-shift per cycle of the cavity. The frequency chirp range $v_{BW}$ is limited to a certain range by the spectral profile of the gain medium, and each frequency component is frequency-chirped with its intensity being changed according to the spectral gain profile.

Figure 3:
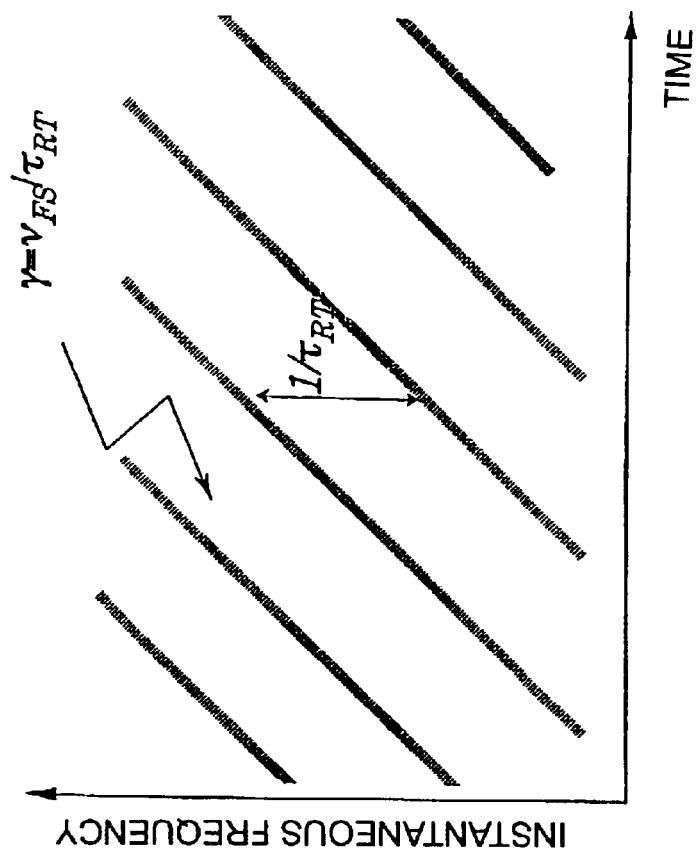
FIG. 3 is a view showing typical instantaneous frequency components of an FSF laser output.

FIG. 3 is a diagram showing typical instantaneous frequency components of the output of the FSF laser 3. In the figure, gray levels show intensity changes. The chirp rate γ is given by $v_{FS}/\tau_{RT}$.

Figure 4:
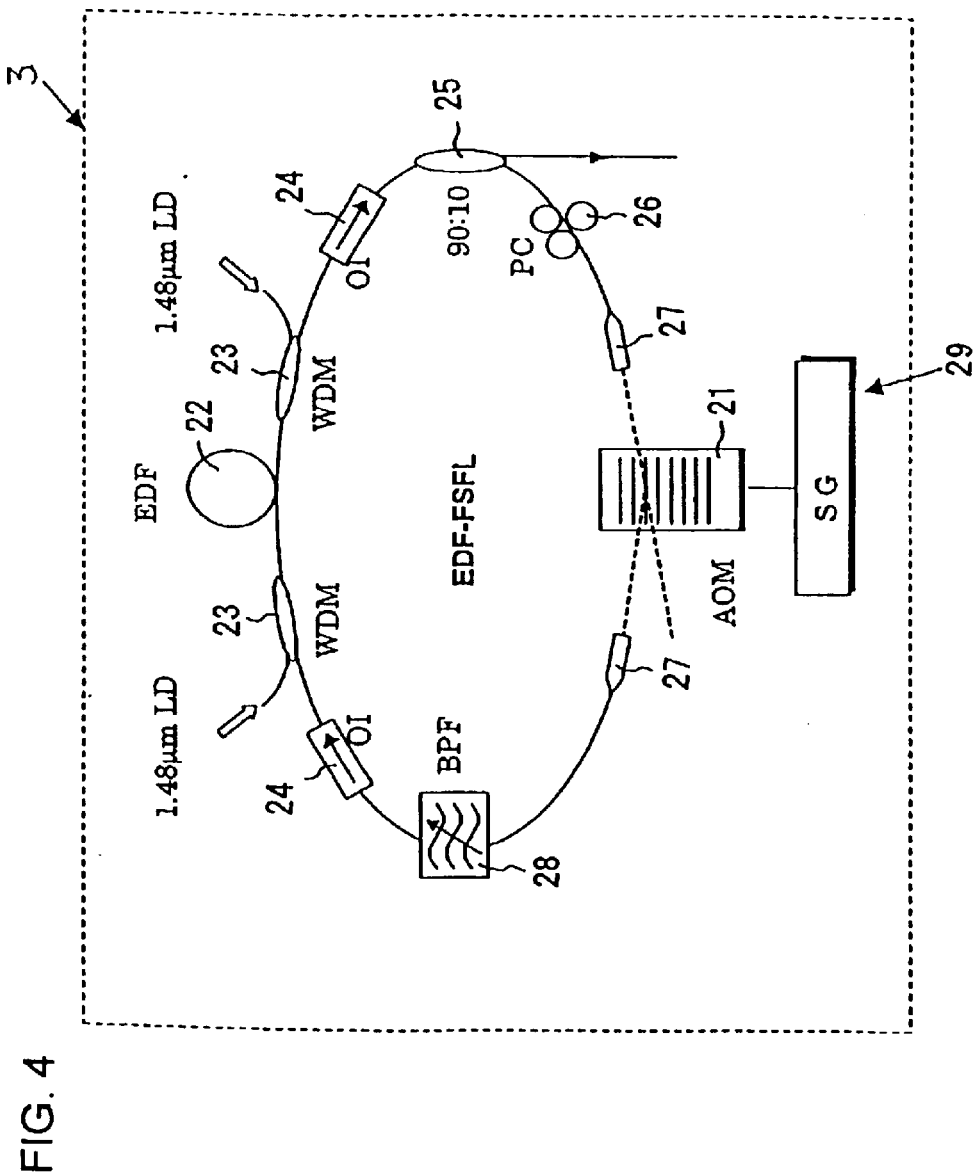
FIG. 4 is a block diagram showing a detailed configuration of an FSF laser.

FIG. 4 is a block diagram showing a detailed configuration of the FSF laser 2. The FSF laser 2 is a ring-shaped laser cavity using an acousto-optic modulator (AOM, whose propagation medium is, for example, TeO$_2$) serving as a frequency-shifting element. In the laser cavity, there are provided an erbium-doped fiber (EDF, having, for example, an Er$^{3+}$-doping concentration of 900 ppm and a fiber length of 15 m) 22 having a high compatibility with the optical fiber; wavelength division multiplexing couplers (WDM) 23 on which light from semiconductor lasers (LD, having, for example, a width of 1.48 μm and a maximum excitation power of 67 mW) is incident, the lasers serving as excitation light sources; optical isolators (OI) 24; an output coupler (whose branching ratio is, for example, 90:10 (10 dB)) 25; a polarization controller (PC) 26; collimators 27; a bandpass filter (BPF) 28; and a signal generator (SG) 29 for driving the AOM 21.

The AOM 21 is inserted between the pair of collimators 27, and the optical coupling efficiency, including its diffraction efficiency, is, for example, 25%. The amount $v_{FS}$ of frequency shift per cycle of the cavity is equal to the driving frequency of the AOM 21, for example, 120 MHz, and the cavity longitudinal-mode frequency $1/\tau_{RT}$ is, for example, 9.38 MHz. Thereby, the chirp rate $\gamma=v_{FS}/\tau_{RT}$ expressing the speed at which the frequency changes becomes 1.13 PHz/s.

Figure 5:
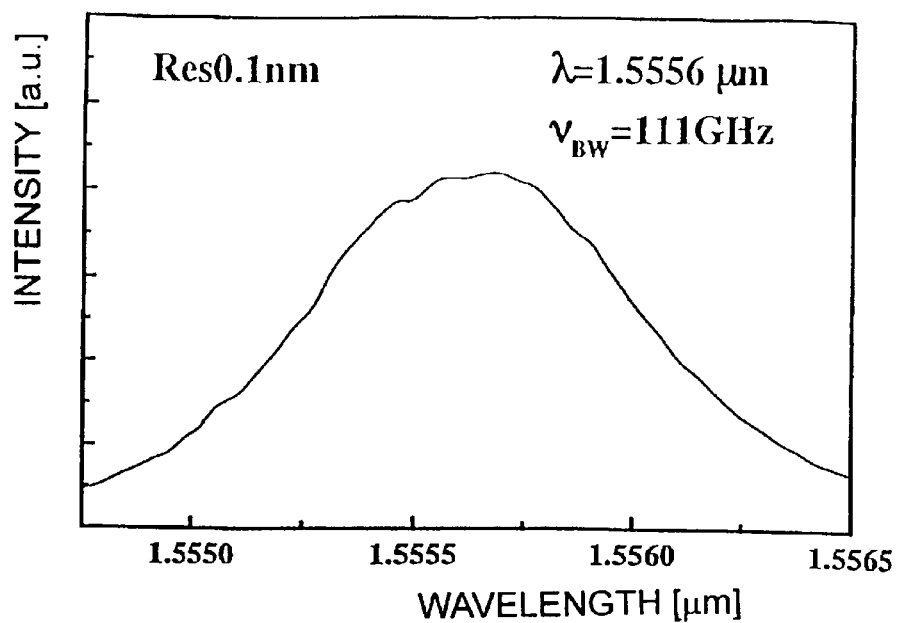
FIG. 5 is a view showing observation results of the oscillated spectrum of the FSF laser shown in FIG. 4, carried out using an optical spectrum analyzer.

FIG. 5 is a view showing the observation results of the oscillated spectrum of the FSF laser 3 shown in FIG. 4, carried out by an optical spectrum analyzer. In this example, the frequency chirp range is 110 GHz from the full width at the half maximum of the oscillated spectrum. The center wavelength of the oscillation is 1.556 μm.

An acousto-optic tunable filter (AOTF) can be used instead of the AOM as the frequency-shifting element. The AOTF is a frequency-shifting element having narrow-band wavelength transmission characteristics. Since the oscillated wavelength becomes electronically tunable by using the AOTF, the BPF in the cavity is not necessary, and the configuration of the device is thus simplified.

PMD measurement using an FSF laser will be described next in detail.

Figure 6:
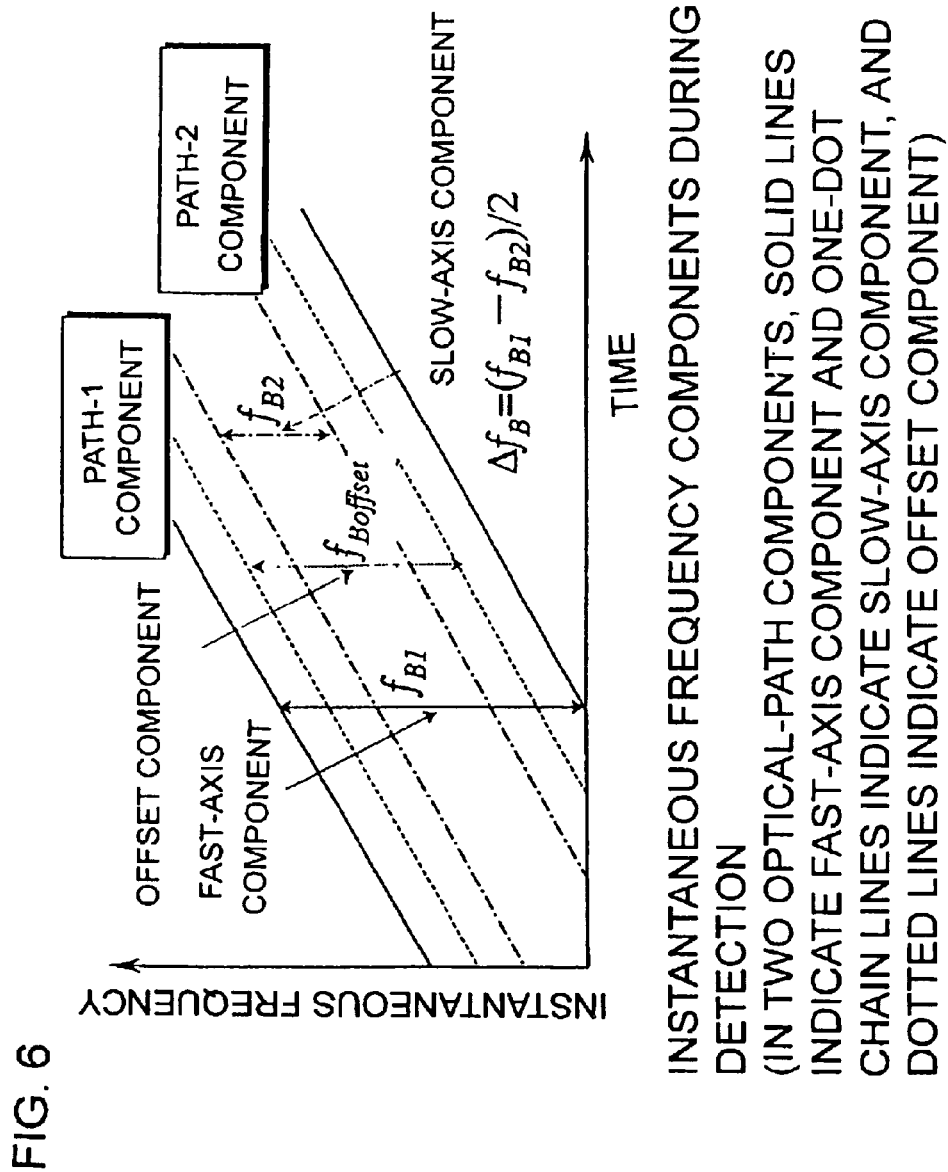
FIG. 6 is a view showing instantaneous frequency components obtained during detection.

FIG. 6 is a view showing instantaneous frequency components during detection. When frequency-chirped light emitted from the FSF laser 3 is detected after it propagates through the optical fiber 1 under test and passes through the analyzer 2, beat signals $f_{B1}$ and $f_{B2}$ dependent on the PMD delay time are generated at both sides of a beat signal ($f_{Boffset}$, hereinafter called the offset frequency) which is proportional to a delay time $t_{offset}$. The signal intensities of these three beat signals $f_{Boffset}$, $f_{B1}$, and $f_{B2}$ depend on the incident angle of the light wave into the optical fiber 1 under test and the angle of the analyzer 2.

The beat signal intensity during detection is given by the following determinant:

$$I \propto \quad (3)$$

$$\left\| \begin{matrix} \sin\beta & 0 \\ 0 & \cos\beta \end{matrix} \right\| \left\| \begin{matrix} 1 & 0 \\ 0 & \exp[-j\tau] \end{matrix} \right\| \left\| \begin{matrix} \cos\alpha & \sin\alpha \\ -\sin\alpha & \cos60 \end{matrix} \right\| \left\| \begin{matrix} 1/\sqrt{2} \\ \exp[-jt_{offset}]/\sqrt{2} \end{matrix} \right\| e(t) \Big|^2$$

$$e(t) = \exp\left[-\left(\frac{\gamma t}{v_{BW}/2}\right)^2 \frac{\ln 2}{2}\right] \left[j2\pi(\phi v_0 t + \frac{\gamma}{2} t^2 + \Phi_0)\right] \quad (4)$$

Figure 8:
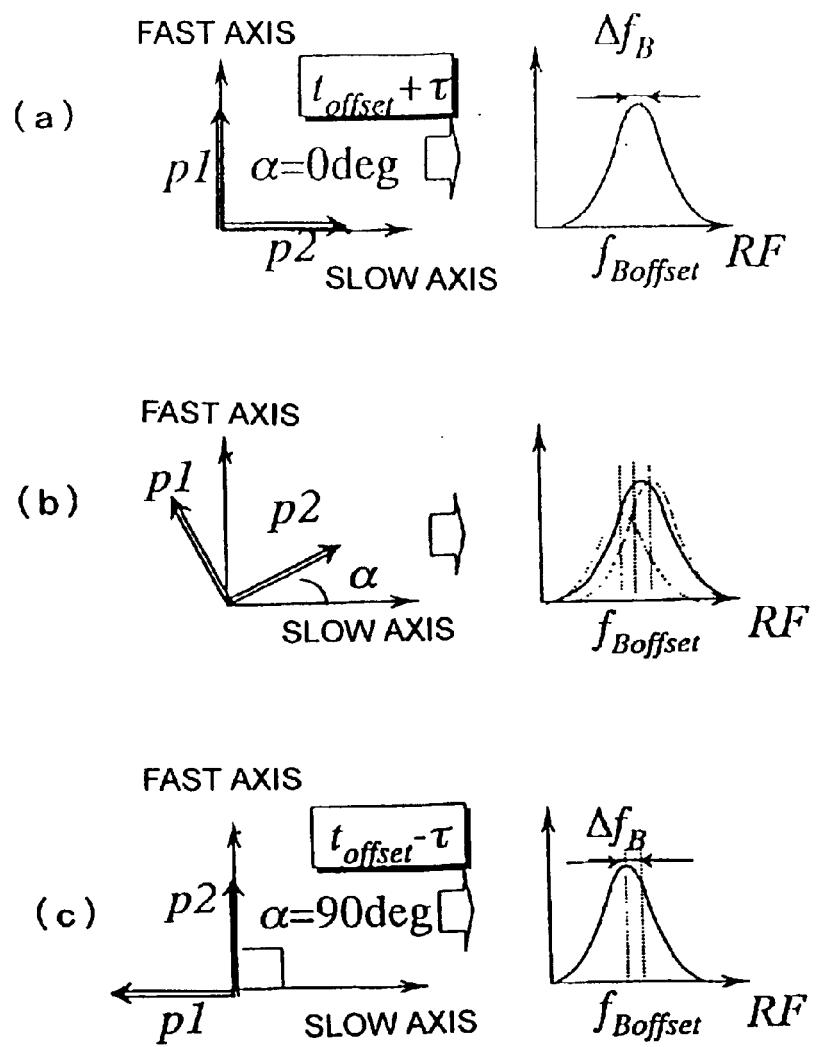
FIGS. 8(a), 8(b), and 8(c) are views showing the relationship between the incident angle of a light wave and beat intensity.

FIG. 7 is a view describing light waves in the offset circuit and components passing through the analyzer. FIG. 8 is a view showing the relationship between the incident angle of a light wave and beat intensity.

As shown in FIG. 7(a) and FIG. 7(b), in expressions (3) and (4), α indicates the angle formed by a path-2 component in the offset circuit 7 and the slow axis of the optical fiber 1 under test, and β indicates the angle formed by the analyzer 2 and the slow axis.

The matrix components of expression (3) indicate, respectively from the left, the effect of the analyzer 2, that of the PMD τ of the optical fiber 1 under test, that of the incident angle of the laser output light, and that of the delay time $t_{offset}$ of the offset circuit 7. When the angle of the analyzer 2 is ideally set to β=45 degrees, the beat frequency is given by expression (5):

$$f_B = f_{Boffset} + \cos 2\alpha \gamma \tau \quad (5)$$

FIG. 8(a), FIG. 8(b), and FIG. 8(c) are views showing relationships between the incident angle α of a light wave on the optical fiber 1 under test and a beat component. When α=0 degrees, that is, when a path-1 component matches the fast axis, since the total delay time becomes $t_{offset} + \tau$, a beat spectrum is generated at the higher frequency side ($f_{B1}$) of the offset frequency, as shown in FIG. 8(a).

Conversely, when α=90 degrees, that is, when the path-2 component matches the fast axis, since the total delay time becomes $t_{offset} - \tau$, a beat spectrum is generated at the lower frequency side ($f_{B2}$) of the offset frequency, as shown in FIG. 8(b).

In contrast, when α is between 0 degrees and 90 degrees, there are two beat spectra $f_{B1}$ and $f_{B2}$, as shown in FIG. 8(c). When the PMD is low, the two spectra overlap. Therefore, fitting is applied to these spectra by the theoretical expression (4) to obtain the beat frequency.

As described above, a PMD value τ is obtained by the following expressions:

$$\Delta f_B = (f_{B1} - f_{B2})/2 \quad (6)$$

$$\tau = \Delta f_B / \gamma \quad (7)$$

where, $\Delta f_B$ indicates the change in beat frequency obtained when the incident angle is changed.

In the present embodiment, the λ/2 plate 8 is used to control the polarization direction of measurement light, the center frequency of the beat signal is measured with the rotation angle θ of the polarization direction being used as a parameter, and a peak-to-peak value $\Delta f_B$ obtained as a result is used to obtain the PMD value. More specifically, the analyzer 2 is arranged first such that it forms an angle of 45 degrees with respect to the fast axis and the slow axis of the optical fiber 1 under test. To this end, the λ/2 plate 8 is rotated in units of 180 degrees and is fixed when the beat spectrum intensity becomes flat. Then, the λ/2 plate 8 is rotated by 180 degrees, and the peak-to-peak value between beat center frequencies is read.

Since this value corresponds to $2\Delta f_B$, the PMD value can be obtained by expression (7).

In addition, in the present embodiment, since the frequency-chirped light propagates through the optical fiber 1, further passes through the analyzer 2, and then is detected, the change in beat frequency is measured, and the PMD value is obtained by expression (7), the PMD value is obtained simply and with high sensitivity. Further, in the present invention, PMD measurement can be applied to existing optical communication networks, and it is not likely that the measurement system has a complicated configuration.

A measurement result obtained by a polarization-mode-dispersion measuring device according to the present invention will be described next. First, in a principle demonstration experiment using a polarization-maintaining optical fiber (PMF), a measurement result of a PMF having high birefringence inside the optical fiber and having no polarization-mode coupling will be shown.

Figure 9:
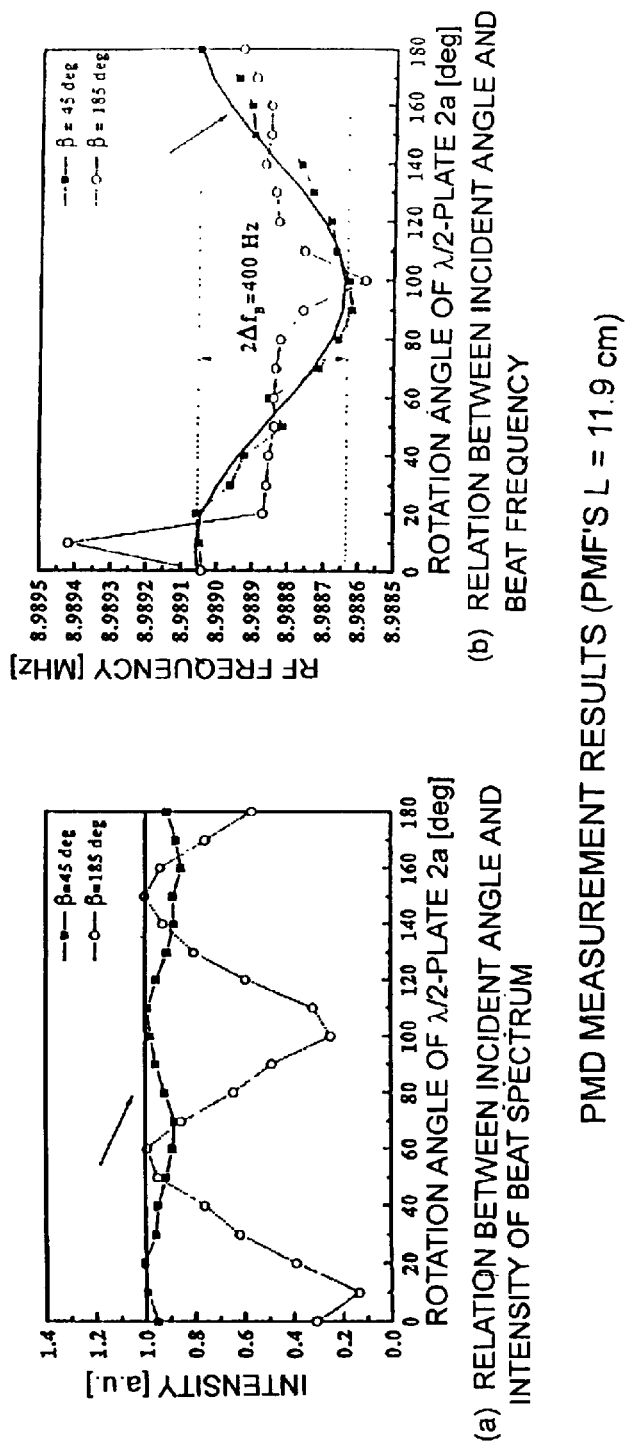
FIG. 9(a) is a view showing the relation between the incident angle of a light wave which has passed through the offset circuit and intensity of beat spectrum.
FIG. 9(b) is a view showing the relation between the incident angle of a light wave which has passed through the offset circuit and beat frequency.

FIG. 9(a) is a view showing the relationship between the incident angle of a light wave which has passed through the offset circuit 7 and beat spectrum intensity, and FIG. 9(b) is a view showing the relationship between the incident angle of a light wave which has passed through the offset circuit 7 and beat frequency. Each figure is obtained at measurement with the angle β of the analyzer being used as a parameter. Solid lines indicate theoretical calculation results, and dotted lines indicate measurement results.

It is found from the results shown in FIG. 9(a) that the beat spectrum intensity is almost constant when the angle β of the analyzer 2 is set to 45 degrees. It is also found from FIG. 9(b) that the change $2\Delta f_B$ of the beat frequency in this case is 400 Hz. From these results, a PMD value τ of 0.18 ps (1.51 ps/m) is obtained.

Measurement results for a single-mode optical fiber (SMF), which is actually used for optical communications, will be shown next. Assuming here that a regular optical communication is performed, and polarization-mode coupling exists inside the optical fiber, a PMD measurement with the use of the single-mode fiber (in this example, a fiber length L is set to 20 km) will be shown.

FIG. 10(a) is a view showing the relationship between the incident angle and beat spectrum intensity, and FIG. 10(b) is a view showing the relationship between the incident angle and beat frequency. Solid lines indicate theoretical calculation results. It is found from the results shown in FIG. 10(a) that the beat spectrum intensity is almost constant irrespective of the incident angle when the angle β of the analyzer 2 is set to 45 degrees, as shown in a result of the above-described principle demonstration experiment. It is also found from FIG. 10(b) that the change $2\Delta f_B$ of the beat frequency is 390 Hz. From these results, a PMD value τ of 0.17 ps (0.04 ps/√km) is obtained.

Figure 11:
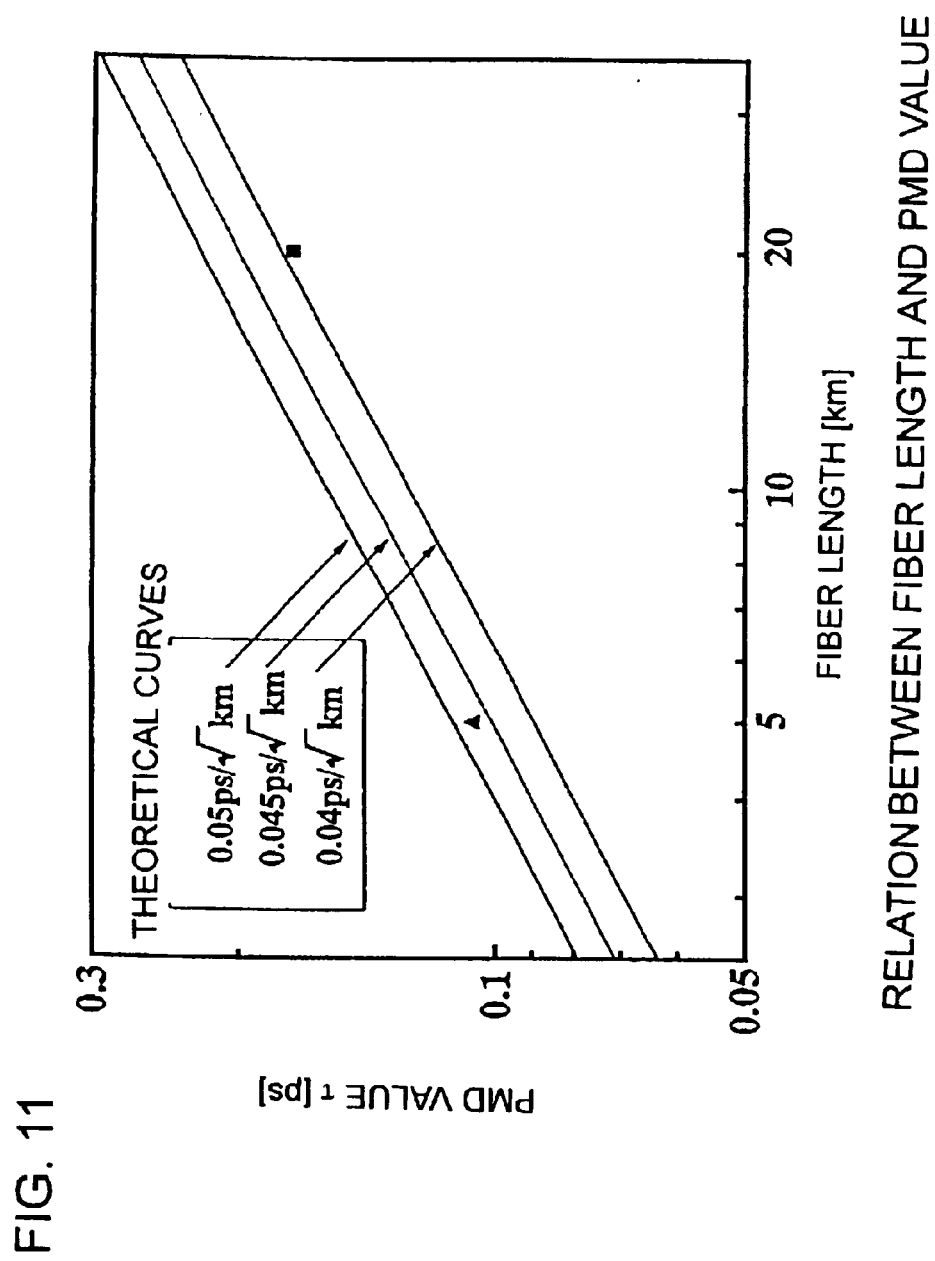
FIG. 11 is a view showing the relation between optical-fiber length and PMD.

FIG. 11 is a view showing the relationship between an optical-fiber length and PMD. As shown in the figure, it is found that the PMD value τ increases in proportion to the square root of the length of the optical fiber 1.

It is understood from expression (6), described above, that the accuracy of the current PMD measurement depends on the reading accuracy of a beat frequency.

Figure 12:
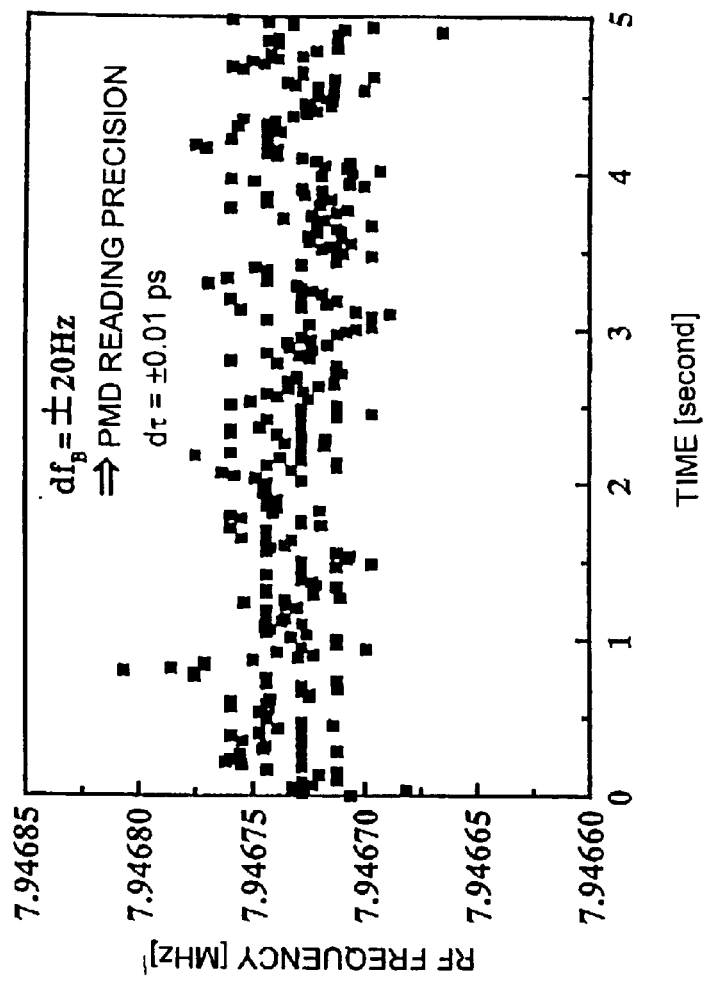
FIG. 12 is a view showing a result of estimating the beat-frequency reading accuracy.

FIG. 12 is a view showing the results of estimating the reading accuracy of a beat frequency. From the result shown in the figure, a accuracy dτ of ±0.01 ps is obtained for PMD measurement using the FSF laser 3. The measurement accuracy depends on the frequency chirp range of the laser output light and the reading accuracy of the spectrum analyzer. Therefore, to perform a high-accuracy measurement, it is necessary to extend the frequency chirp range and to measure the beat frequency by the use of a frequency counter.

Other embodiments of the present invention will be described next.

Figure 13:
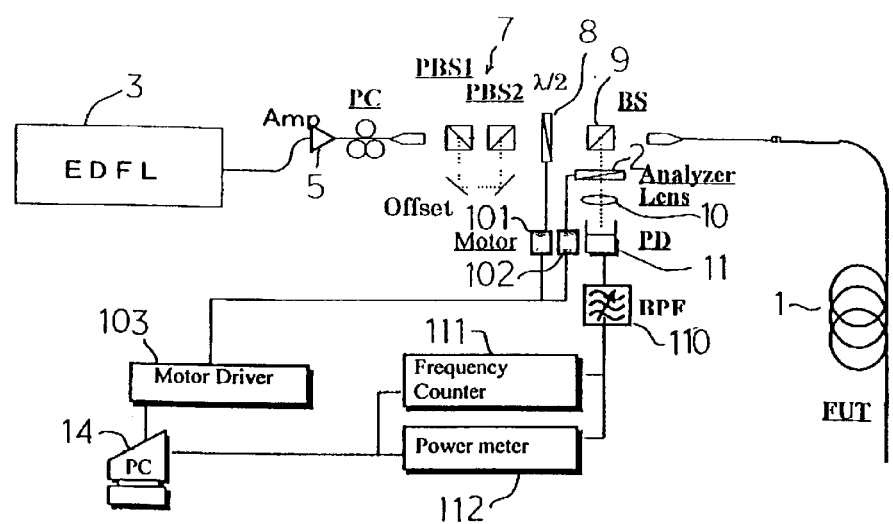
FIG. 13 is a block diagram showing the entire configuration of a polarization-mode-dispersion measuring device according to a second embodiment of the present invention.

FIG. 13 is a block diagram showing the entire configuration of a polarization-mode-dispersion measuring device according to a second embodiment of the present invention.

In the present embodiment, in addition to the above-described configuration, driving sections 101 and 102, a control section 103, a bandpass filter 110, a frequency counter 111, and a power meter 112 are provided.

Since the optimum condition of the angle of the analyzer, which is important in PMD measurement, does not depend on the incident angle but needs to maintain the beat spectrum intensity at a constant state, when the λ/2 plate 8 and the analyzer 2 are automatically controlled by the driving sections 101 an 102, such as a motor, and by the control section 103, such as a motor driver, measurement work which has been manually performed so far can be made fully automatic.

More specifically, the control section 103 controls the driving section 102 such that the analyzer 2 is set to 45 degrees with respect to the fast axis and the slow axis of the optical fiber 1 under test. To this end, the λ/2 plate 8 is rotated in units of 180 degrees and is fixed when the beat spectrum intensity becomes flat. Then, the control section 103 controls the driving section 101 such that the λ/2 plate 8 is rotated by 180 degrees, and the peak-to-peak value between beat center frequencies is read. Since this value corresponds to a minute change $2\Delta f_B$, the PMD value can be obtained by substituting it in expression (1).

When the frequency counter 111, the power meter 112, and the bandpass filter (BPF) 110 are used instead of the RF spectrum analyzer (real-time spectrum analyzer), which is currently used, in beat-frequency measurement, a more simple device configuration is allowed.

Chirped light generating means according to other embodiments will be described below. There chirped light generating means has a structure which can be substituted for the FSF laser 3 in the above-described measuring device.

Figure 14:
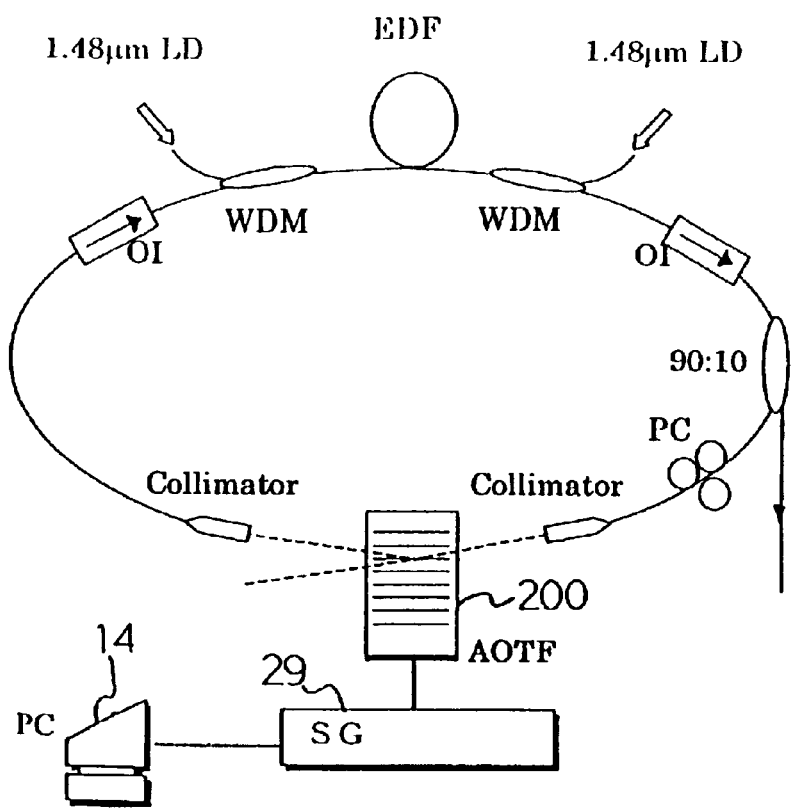
FIG. 14 is a view showing a structural view of chirped light generating means according to the second embodiment.

FIG. 14 is a structural view of chirped light generating means according to a second embodiment. An acousto-optic tunable filter (AOTF) 200 is used as the frequency-shifting element shown in FIG. 4, and the BPF 28 is omitted. The oscillated wavelength can be electronically controlled when the PC 8 controls the signal generator 29 serving as a driving signal source.

Figure 15:
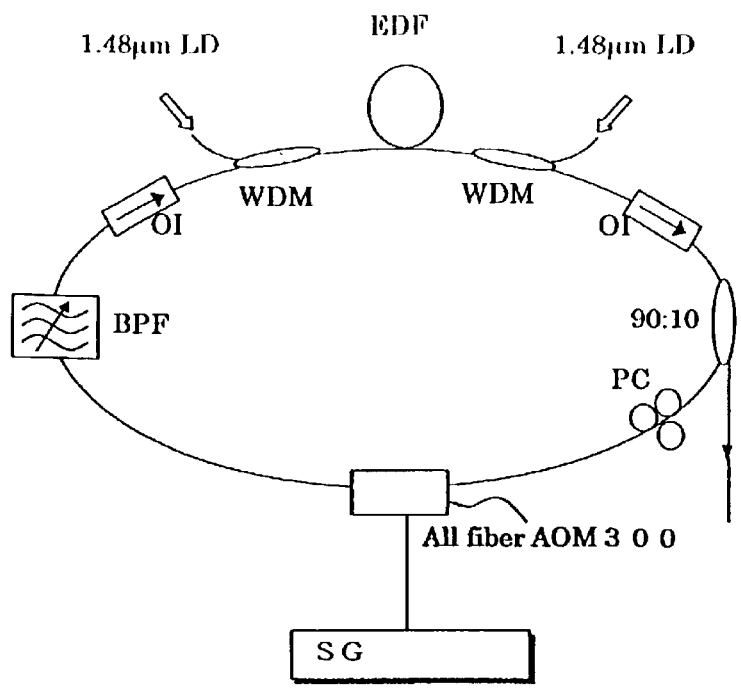
FIG. 15 is a view showing a structural view of chirped light generating means according to a third embodiment.

FIG. 15 is a structural view of chirped light generating means according to a third embodiment. An all-fiber acousto-optic modulator (all-fiber AOM) 300 using an optical fiber as a medium is used as the frequency-shifting element shown in FIG. 4, and the collimators 27 are omitted, so that the measuring device can have an all-fiber configuration.

Any appropriate frequency-chirped light source whose oscillated frequency shifts with time can be employed. Further, instead of measurement being performed at the input side of the optical fiber 1 under test, as described above, a measurement system may be provided at the output side. In addition, a circulator may be used instead of the beam splitter 9 to reduce an insertion loss in the entire configuration of the above-described embodiments.

INDUSTRIAL APPLICABILITY

As described above in detail, according to the present invention, since the frequency-chirped light propagates through the optical fiber, further passes through the analyzer, and then is detected, and a self-beat signal obtained at this time is used to measure polarization mode dispersion, polarization-mode-dispersion is measured by a simple configuration with high sensitivity. Further, according to the present invention, even when the PMD value is small, polarization-mode-dispersion measurement is always allowed to be performed without making a generated beat signal undetectable in a DC component.

What is claimed is:

1. A polarization-mode-dispersion measuring device comprising:

chirped light generating means for generating frequency-chirped light whose frequency changes in proportion to time;

offset means for branching the frequency-chirped light generated by the chirped light generating means into two orthogonal linearly polarized components and for applying an optical path difference to the two linearly polarized components;

a wave plate for rotating the linear-polarization directions of the frequency-chirped light sent from the offset means, by a predetermined angle;

an analyzer for passing polarization components required for measurement after the frequency-chirped light has passed through the wave plate and has propagated through an optical fiber under test; and detection means for detecting light waves which pass through the analyzer and for detecting the polarization-mode dispersion value of the optical fiber under test according to a beat signal of the detected light waves.

2. The polarization-mode-dispersion measuring device according to claim 1 wherein:

the chirped light generating means uses an all-fiber acousto-optic modulator as the frequency-shifting element using an optical fiber as a medium to allow the measuring device to have an all-fiber configuration.

3. The polarization-mode-dispersion measuring device according to claim 1 wherein:

the chirped light generating means has a frequency-shifting element for shifting the frequency, and feeds back frequency-shifted diffraction light to generate the frequency-chirped light beams.

4. The polarization-mode-dispersion measuring device according to claim 3 wherein:

the chirped light generating means has a ring cavity in which a gain medium, an excitation light source, an optical coupler, and a frequency-shifting element are connected in a ring shape.

5. The polarization-mode-dispersion measuring device according to claim 4 wherein:

the chirped light generating means generates the frequency-chirped light whose frequency varies at a rate equal to the frequency shift amount which the frequency-shifting element applies to an optical wave in the ring cavity per cycle of the cavity.

6. The polarization-mode-dispersion measuring device according to claim 3 wherein:

the chirped light generating means further comprises a band-bass filter to tune the oscillated wavelengths of the frequency-chirped light beams.

7. The polarization-mode-dispersion measuring device according to claim 6 wherein:

the chirped light generating means uses an acousto-optic tunable filter as the frequency-shifting element, and tunes the oscillated wavelengths using the driving frequency of the filter.

8. A polarization-mode-dispersion measuring device according to claim 1, characterized in that: the chirped light generating means comprises a light source whose oscillated frequency shifts with time.

9. A polarization-mode-dispersion measuring device according to claim 1, characterized in that:

the analyzer is disposed such that it forms an angle of about 45 degrees with respect to a fast axis and a slow axis of the optical fiber under test.

10. A polarization-mode-dispersion measuring device according to claim 9, further comprising a driving section for controlling the rotation angle of the analyzer and the wave plate, wherein the angle of the analyzer with respect to the fast axis and the slow axis of the optical fiber under test is fixed, the center frequency of the beat signal is measured with the rotation angle of the wave plate being used as a parameter, and a polarization-mode dispersion value is measured according to a measured peak value.

11. A polarization-mode-dispersion measuring method comprising:

a step of generating frequency-chirped light whose frequency changes in proportion to time;

a step of branching the generated frequency-chirped light into two orthogonal linearly polarized components and of applying an optical path difference to the two linearly polarized components;

a step of rotating the linear-polarization directions of the frequency-chirped light by a predetermined angle;

a step of propagating the frequency-chirped light to which the optical path difference is applied, through an optical fiber under test;

a step of passing polarization components required for measurement after the frequency-chirped light has propagated through the optical fiber under test; and a step of detecting the light waves which pass through, and of detecting the polarization-mode dispersion value of the optical fiber under test according to a beat signal of the detected light waves.

12. A polarization-mode-dispersion measuring method according to claim 11, characterized by comprising a step of fixing the angle of an analyzer with respect to a fast axis and a slow axis of the optical fiber under test such that the required polarization components pass there through, wherein the direction of the linearly polarized components incident on the optical fiber under test are rotated by a predetermined angle, the center frequency of the beat signal is measured with the rotation angle being used as a parameter, and the polarization-mode dispersion value is measured according to a measured peak value.

* * * * *